United States Patent [19]
Muller et al.

[11] Patent Number: 5,938,736
[45] Date of Patent: Aug. 17, 1999

[54] SEARCH ENGINE ARCHITECTURE FOR A HIGH PERFORMANCE MULTI-LAYER SWITCH ELEMENT

[75] Inventors: Shimon Muller, Sunnyvale; Ariel Hendel, Cupertino; Louise Yeung, San Carlos, all of Calif.

[73] Assignee: Sun Microsystems, Inc., Mountain View, Calif.

[21] Appl. No.: 08/885,116

[22] Filed: Jun. 30, 1997

[51] Int. Cl.$^6$ ............................. G06F 13/38; G06F 15/17
[52] U.S. Cl. ........................... 709/243; 709/236; 370/392
[58] Field of Search ........................... 395/200.73, 200.7, 395/200.68, 200.66, 200.75; 370/386, 389, 428, 392

[56] References Cited

U.S. PATENT DOCUMENTS

| | | | |
|---|---|---|---|
| 4,652,874 | 3/1987 | Loyer | 340/825.05 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/427 |
| 4,922,503 | 5/1990 | Leone | 370/85.13 |

(List continued on next page.)

OTHER PUBLICATIONS

International Search Report, PCT/US98/13202, 4 pages.
International Search Report, PCT/US98/13368, 5 pages.
International Search Report, PCT/US98/13364, 4 pages.
International Search Report, PCT/US98/13365, 4 pages.
International Search Report, PCT/US98/13177, 4 pages.
International Search Report, PCT/US98/13199, 5 pages.
International Search Report, PCT/US98/13015, 5 pages.
Wang et al., A Novel Message Switch for Highly Parallel Systems, IEEE, pp. 150–155, 1989.

Tobagi, Fast Packet SwitchArchitectures for Broadband Integrated Services Digital Networks, Proceedings of the IEEE, vol. 78, Issue 1, pp. 133–167, Jan. 1990.

Fliesser et al., Design of a Multicast ATM Packet Switch, Electrical and Computer Engineering, 1993 Canadian Conference, pp. 779–783, 1993.

Chang et al., An Overview of the Pipelined Common Buffer Architecture (PCBA) for Memory Based Packet/Cell Switching Systems, Local Computer Networks, 1994, pp. 288–297, 19th Conference, IEEE.

Agrawal et al., A Scalable Shared Buffer ATM Switch Architecture, VLSI, 1995 5th Great Lakes Symposium, IEEE, pp. 256–261, 1994.

(List continued on next page.)

*Primary Examiner*—Mark H. Rinehart
*Attorney, Agent, or Firm*—Blakely Sokoloff Taylor & Zafman

[57] ABSTRACT

A multi-layer switch search engine architecture is provided. According to one aspect of the present invention, a switch fabric includes a search engine, and a packet header processing unit. The search engine may be coupled to a forwarding database memory and one or more input ports. The search engine is configured to schedule and perform accesses to the forwarding database memory and to transfer forwarding decisions to the one or more input ports. The header processing unit is coupled to the search engine and includes an arbitrated interface for coupling to the one or more input ports. The header processing unit is configured to receive a packet header from one or more of the input ports and is further configured to construct a search key for accessing the forwarding database memory based upon a predetermined portion of the packet header. The predetermined portion of the packet header is selected based upon a packet class with which the packet header is associated.

23 Claims, 9 Drawing Sheets

U.S. PATENT DOCUMENTS

| | | | |
|---|---|---|---|
| 4,933,938 | 6/1990 | Sheehy | 370/85.13 |
| 4,935,869 | 6/1990 | Yamamoto | 395/200.66 |
| 5,150,358 | 9/1992 | Punj et al. | 370/468 |
| 5,210,746 | 5/1993 | Maher et al. | 370/79 |
| 5,220,562 | 6/1993 | Takada et al. | 370/401 |
| 5,231,633 | 7/1993 | Hluchyj et al. | 370/94.1 |
| 5,251,205 | 10/1993 | Callon et al. | 370/60 |
| 5,278,830 | 1/1994 | Kudo | 370/94.1 |
| 5,291,482 | 3/1994 | McHarg et al. | 370/413 |
| 5,293,379 | 3/1994 | Carr | 370/474 |
| 5,301,333 | 4/1994 | Lee | 395/725 |
| 5,309,437 | 5/1994 | Perlman et al. | 340/827 |
| 5,343,471 | 8/1994 | Cassagnol | 370/85.13 |
| 5,353,412 | 10/1994 | Douglas et al. | 395/200.73 |
| 5,386,413 | 1/1995 | McAuley et al. | 370/54 |
| 5,392,432 | 2/1995 | Engelstad et al. | 395/700 |
| 5,394,402 | 2/1995 | Ross | 370/94.1 |
| 5,410,540 | 4/1995 | Aiki et al. | 370/390 |
| 5,410,722 | 4/1995 | Cornaby | 395/800 |
| 5,422,838 | 6/1995 | Lin | 365/49 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/413 |
| 5,457,681 | 10/1995 | Gaddis et al. | 370/402 |
| 5,459,714 | 10/1995 | Lo et al. | 370/13.1 |
| 5,459,717 | 10/1995 | Mullan et al. | 370/351 |
| 5,461,611 | 10/1995 | Drake, Jr. et al. | 370/54 |
| 5,461,624 | 10/1995 | Mazzola | 370/402 |
| 5,473,607 | 12/1995 | Hausman | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/255 |
| 5,485,578 | 1/1996 | Sweazey | 395/200.54 |
| 5,490,139 | 2/1996 | Baker et al. | 370/60 |
| 5,490,252 | 2/1996 | Macera et al. | 395/200.01 |
| 5,500,860 | 3/1996 | Perlman et al. | 370/85.13 |
| 5,509,123 | 4/1996 | Dobbins et al. | 395/200.73 |
| 5,515,376 | 5/1996 | Murthy et al. | 340/402 |
| 5,535,202 | 7/1996 | Kondoh | 370/60.1 |
| 5,555,405 | 9/1996 | Griesmaer et al. | 395/600 |
| 5,561,666 | 10/1996 | Christensen et al. | 370/434 |
| 5,561,791 | 10/1996 | Mendelson et al. | 395/200.66 |
| 5,570,365 | 10/1996 | Yodhida | 370/85.6 |
| 5,572,522 | 11/1996 | Calamvokis et al. | 370/395 |
| 5,583,981 | 12/1996 | Pleyer | 395/326 |
| 5,594,727 | 1/1997 | Kolbenson et al. | 370/468 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,610,905 | 3/1997 | Murthy et al. | 370/401 |
| 5,617,421 | 4/1997 | Chin et al. | 370/402 |
| 5,619,500 | 4/1997 | Hiekali | 370/414 |
| 5,619,661 | 4/1997 | Crews et al. | 395/299 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 370/200.12 |
| 5,684,800 | 11/1997 | Dobbins et al. | 370/401 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.8 |
| 5,724,358 | 3/1998 | Headrick et al. | 370/418 |
| 5,726,977 | 3/1998 | Lee | 370/235 |
| 5,734,865 | 3/1998 | Yu | 395/500 |
| 5,740,171 | 4/1998 | Mazzola et al. | 370/392 |
| 5,740,175 | 4/1998 | Wakeman et al. | 395/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 370/351 |
| 5,745,048 | 4/1998 | Taguchi et al. | 340/870.01 |
| 5,748,905 | 5/1998 | Hauser et al. | 395/200.79 |
| 5,751,967 | 5/1998 | Raab et al. | 395/200.58 |
| 5,754,540 | 5/1998 | Liu et al. | 370/315 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/401 |
| 5,764,636 | 6/1998 | Edsall | 370/401 |
| 5,781,549 | 7/1998 | Dai | 370/398 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,052 | 9/1998 | Venkataraman | 370/395 |

OTHER PUBLICATIONS

Sabaa et al., Implementation of a Window–Based Scheduler in an ATM Switch, Electrical and Computer Engineering, 1995 Canadian Conference, IEEE, pp. 32–35, 1995.

Naraghi–Pour et al., A Multiple Shared Memory Switch, System Theory, 1996 Southeastern Symposium, IEEE, p. 50–541996.

Iyengar et al., Switching Prioritized Packets, Globecom '89: IEEE Global Telecommunications Conference, pp. 1181–1186, 1989.

"Foundry Products", downloaded from Website http://www.foundrynet.com/ on Jun. 19, 1997.

Anthony J. McAuley & Paul Francis, "Fast Routing Table Lookup Using CAMs", IEEE, 1993, pp. 1382–1390.

"Gigabit Ethernet", Network Strategy Report, The Burton Group, v2, May 8, 1997 40 pages.

"IP On Speed", Erica Roberts, Internet–Draft, Data Communications on the Web, Mar. 1997, 12 pages.

"Multilayer Topology", White Paper, Internet–Draft, 13 pages, downloaded from website http://wwwbaynetworks.com on Apr. 18, 1997.

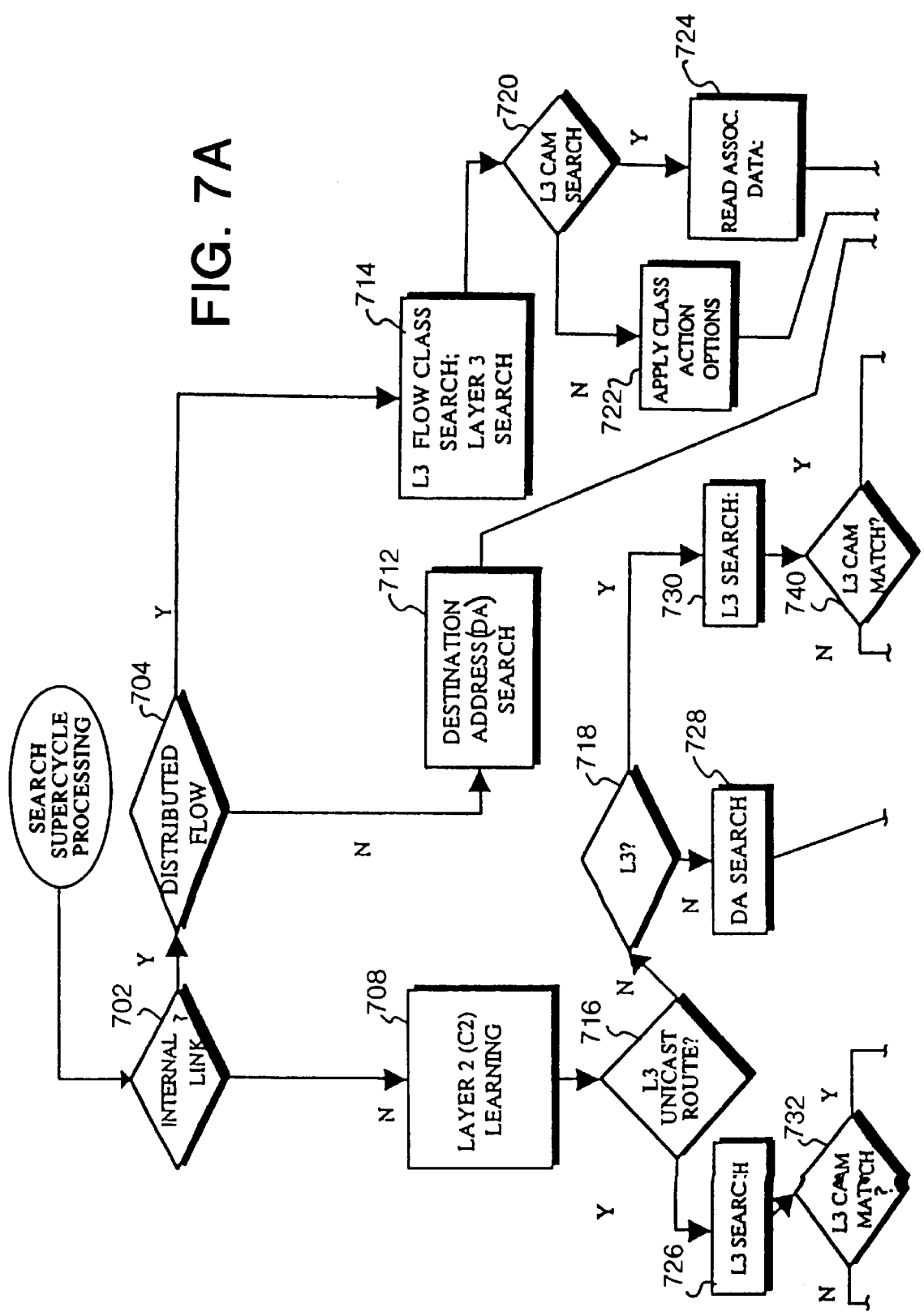

SEARCH ENGINE ARCHITECTURE FOR A HIGH PERFORMANCE MULTI-LAYER SWITCH ELEMENT

FIELD OF THE INVENTION

The invention relates generally to the field of computer networking devices. More particularly, the invention relates to a multi-layer switch search engine architecture.

BACKGROUND OF THE INVENTION

Local area networks (LANs) have become quite sophisticated in architecture. Originally, LANs were thought of a single wire connecting a few computers. Today LANs are implemented in complicated configurations to enhance functionality and flexibility. In such a network, packets are transmitted from a source device to a destination device; in more expansive networks, this packet can travel through one or more switches and/or routers. Standards have been set to define the packet structure and layers of functionality and sophistication of a network. For example, the TCP/IP protocol stack defines four distinct multiple layers, e.g. the physical layer (layer 1), data link layer (layer 2), network layer (layer 3), transport layer (layer 4). A network device may be capable of supporting one or more of the layers and refer to particular fields of the header accordingly.

Today, typical LANs utilize a combination of Layer 2 (data link layer) and Layer 3 (network layer) network devices. In order to meet the ever increasing performance demands from the network, functionality that has been traditionally performed in software and/or in separate layer 2 and layer 3 devices have migrated into one multi-layer device or switch that implements the performance critical functions in hardware.

One of the critical aspects for achieving a cost-effective high-performance switch implementation is the architecture of the forwarding database search engine, which is the centerpiece of every switch design. Therefore, it is desirable to optimize partitioning of the functional modules, provide efficient interaction between the search engine and its "clients" (e.g., switch input ports and the central processing unit), and optimize the execution order of events, all of which play a crucial role in the overall performance of the switching fabric. Also, it is desirable to support diverse traffic types and policies by providing flexibility to match different packet header fields. Ideally this architecture should also allow for a very high level of integration in silicon, and linearly scale in performance with the advances in silicon technology.

SUMMARY OF THE INVENTION

A multi-layer switch search engine architecture is described. According to one aspect of the present invention, a switch fabric includes a search engine, and a packet header processing unit. The search engine may be coupled to a forwarding database memory and one or more input ports. The search engine is configured to schedule and perform accesses to the forwarding database memory and to transfer forwarding decisions to the one or more input ports. The header processing unit is coupled to the search engine and includes an arbitrated interface for coupling to the one or more input ports. The header processing unit is configured to receive a packet header from one or more of the input ports and is further configured to construct a search key for accessing the forwarding database memory based upon a predetermined portion of the packet header. The predetermined portion of the packet header is selected based upon a packet class with which the packet header is associated.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A search engine architecture for a high performance multi-layer switch element is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. While the steps of the present invention are preferably performed by the hardware components described below, the steps may alternatively be embodied in machine-executable instructions, which may be used to cause a general-purpose or special-purpose processor programmed with the instructions to perform the steps. Further, embodiments of the present invention will be described with reference to a high speed Ethernet switch employing a combination of random access memory (RAM) and content addressable memories (CAMs). However, the method and apparatus described herein are equally applicable to other types of network devices such as repeaters, bridges, routers, brouters, and other network devices and also alternative memory types and arrangements.

AN EXEMPLARY NETWORK ELEMENT

Figure 1:
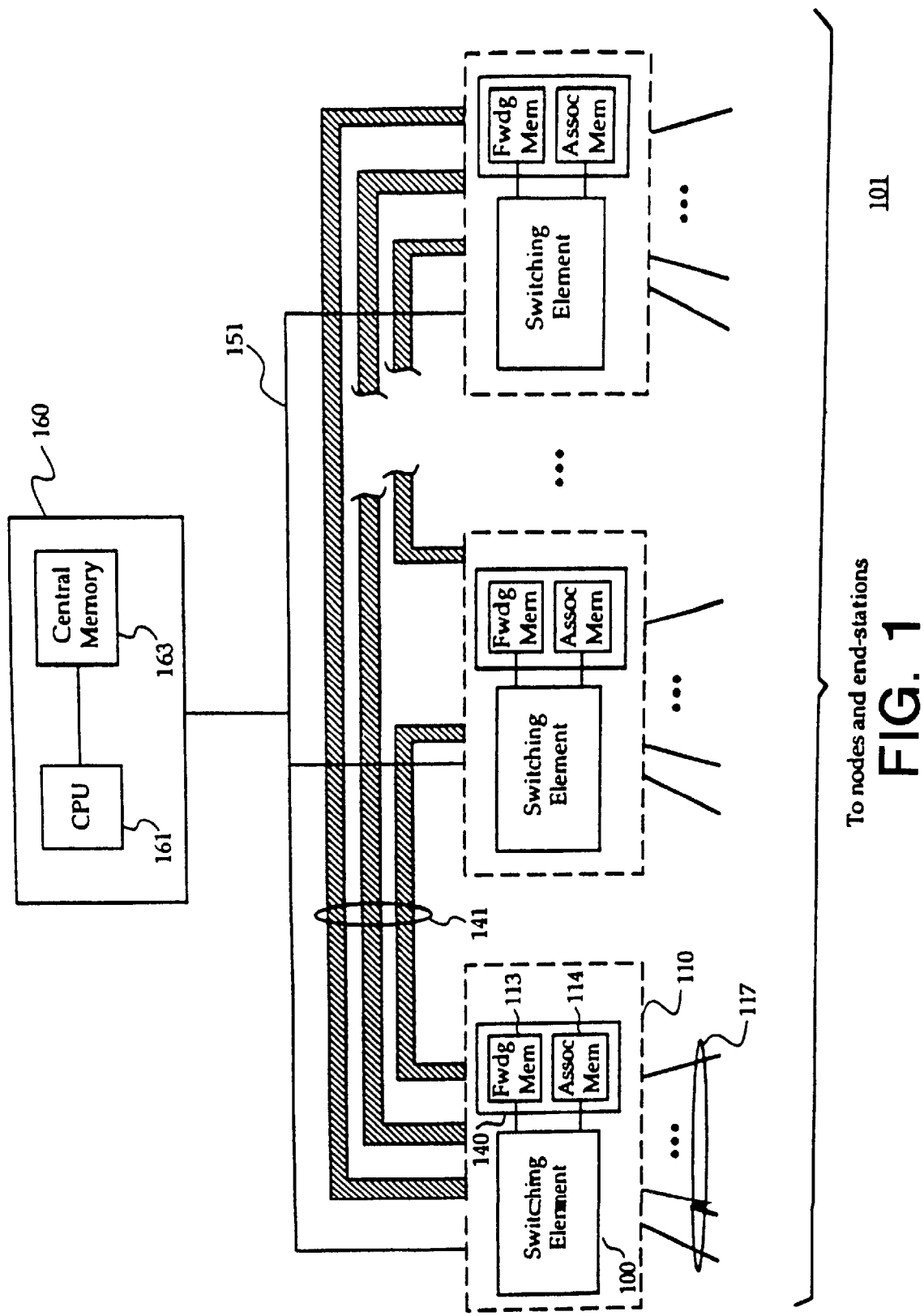
FIG. 1 illustrates a switch according to one embodiment of the present invention.

An overview of one embodiment of a network element that operates in accordance with the teachings of the present invention is illustrated in FIG. 1. The network element is used to interconnect a number of nodes and end-stations in a variety of different ways. In particular, an application of the multi-layer distributed network element (MLDNE) would be to route packets according to predefined routing protocols over a homogenous data link layer such as the IEEE 802.3 standard, also known as the Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as a Layer 4 protocol, while the IP is referred to repeatedly as a Layer 3 protocol.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 1, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 1, the MLDNE 101 contains a number of subsystems 110 that are fully meshed and interconnected using a number of internal links 141 to create a larger switch. At least one internal link couples any two subsystems. Each subsystem 110 includes a switch element 100 coupled to a forwarding and filtering database 140, also referred to as a forwarding database. The forwarding and filtering database may include a forwarding memory 113 and an associated memory 114. The forwarding memory (or database) 113 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 117. In one embodiment, each subsystem supports multiple Gigabit Ethernet ports, Fast Ethernet ports and Ethernet ports. Internal ports (not shown) also having input and output capability in each subsystem couple the internal links 141. Using the internal links, the MLDNE can connect multiple switching elements together to form a multigigabit switch.

The MLDNE 101 further includes a central processing system (CPS) 160 that is coupled to the individual subsystem 110 through a communication bus 151 such as the peripheral components interconnect (PCI). The CPS 160 includes a central processing unit (CPU) 161 coupled to a central memory 163. Central memory 163 includes a copy of the entries contained in the individual forwarding memories 113 of the various subsystems. The CPS has a direct control and communication interface to each subsystem 110 and provides some centralized communication and control between switch elements.

AN EXEMPLARY SWITCH ELEMENT

Figure 2:
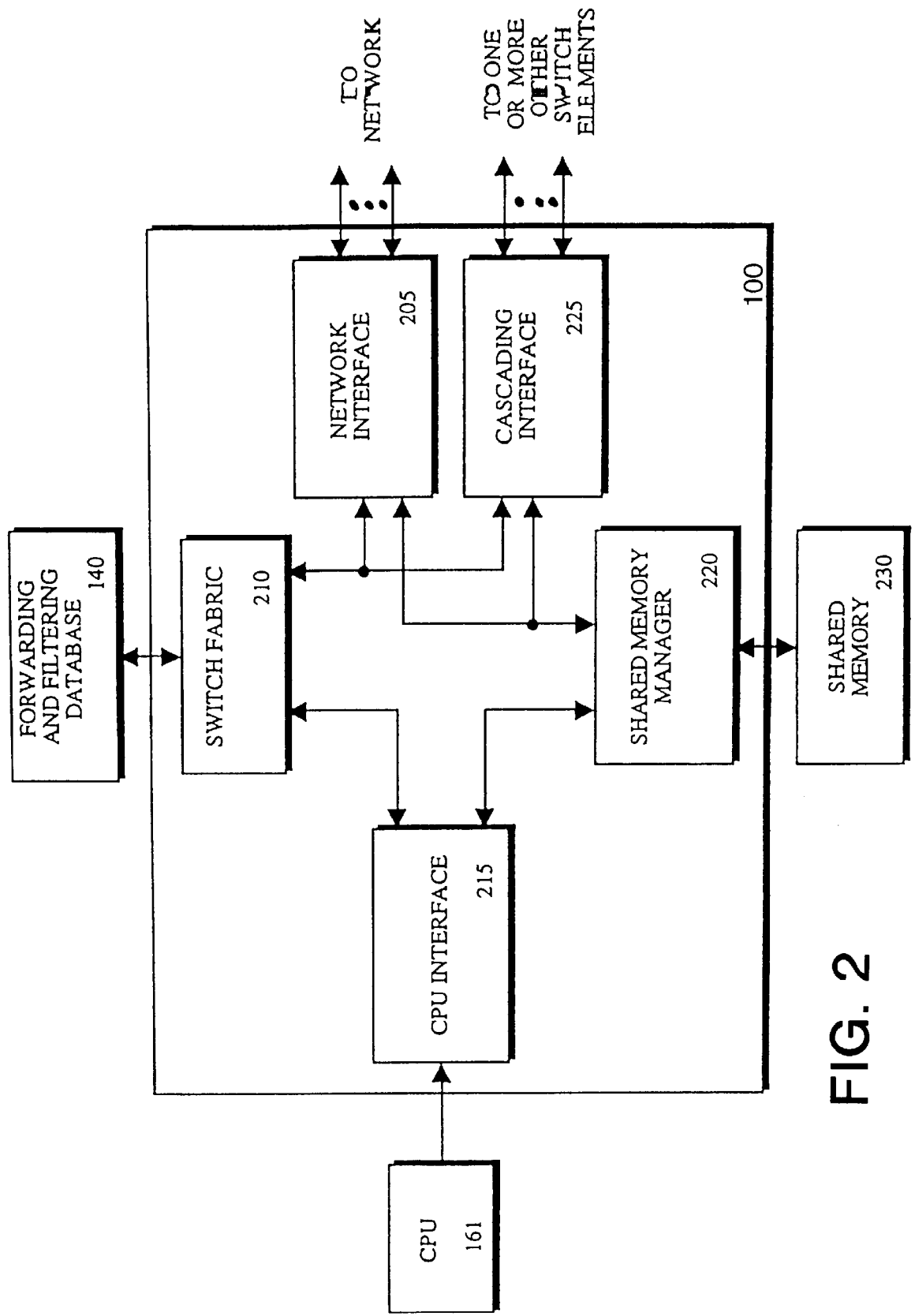
FIG. 2 is a simplified block diagram of an exemplary switch element that may be utilized in the switch of FIG. 1.

FIG. 2 is a simplified block diagram illustrating an exemplary architecture of the switch element of FIG. 1. The switch element 100 depicted includes a central processing unit (CPU) interface 215, a switch fabric block 210, a network interface 205, a cascading interface 225, and a shared memory manager 220.

Ethernet packets may enter or leave the network switch element 100 through any one of the three interfaces 205, 215, or 225. In brief, the network interface 205 operates in accordance with a corresponding Ethernet protocol to receive Ethernet packets from a network (not shown) and to transmit Ethernet packets onto the network via one or more external ports (not shown). An optional cascading interface 225 may include one or more internal links (not shown) for interconnecting switching elements to create larger switches. For example, each switch element 100 may be connected together with other switch elements in a full mesh topology to form a multi-layer switch as described above. Alternatively, a switch may comprise a single switch element 100 with or without the cascading interface 225.

The CPU 161 may transmit commands or packets to the network switch element 100 via the CPU interface 215. In this manner, one or more software processes running on the CPU 161 may manage entries in an external forwarding and filtering database 140, such as adding new entries and invalidating unwanted entries. In alternative embodiments, however, the CPU 161 may be provided with direct access to the forwarding and filtering database 140. In any event, for purposes of packet forwarding, the CPU port of the CPU interface 215 resembles a generic input port into the switch element 100 and may be treated as if it were simply another external network interface port. However, since access to the CPU port occurs over a bus such as a peripheral components interconnect (PCI) bus, the CPU port does not need any media access control (MAC) functionality.

Returning to the network interface 205, the two main tasks of input packet processing and output packet processing will now briefly be described. Input packet processing may be performed by one or more input ports of the network interface 205. Input packet processing includes the following: (1) receiving and verifying incoming Ethernet packets, (2) modifying packet headers when appropriate, (3) requesting buffer pointers from the shared memory manager 220 for storage of incoming packets, (4) requesting forwarding decisions from the switch fabric block 210, (5) transferring the incoming packet data to the shared memory manager 220 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 205. Output processing includes requesting packet data from the shared memory manager 220, transmitting packets onto the network, and requesting deallocation of buffer(s) after packets have been transmitted.

The network interface 205, the CPU interface 215, and the cascading interface 225 are coupled to the shared memory manager 220 and the switch fabric block 210. Preferably, critical functions such as packet forwarding and packet buffering are centralized as shown in FIG. 2. The shared memory manager 220 provides an efficient centralized interface to the external shared memory 230 for buffering of incoming packets. The switch fabric block 210 includes a search engine and learning logic for searching and maintaining the forwarding and filtering database 140 with the assistance of the CPU 161.

The centralized switch fabric block 210 includes a search engine that provides access to the forwarding and filtering database 140 on behalf of the interfaces 205, 215, and 225. Packet header matching, Layer 2 based learning, Layer 2 and Layer 3 packet forwarding, filtering, and aging are exemplary functions that may be performed by the switch fabric block 210. Each input port is coupled with the switch fabric block 210 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 100.

In the present embodiment, Ethernet packets are centrally buffered and managed by the shared memory manager 220. The shared memory manager 220 interfaces every input port and output port and performs dynamic memory allocation and deallocation on their behalf, respectively. During input packet processing, one or more buffers are allocated in the external shared memory 230 and an incoming packet is stored by the shared memory manager 220 responsive to commands received from the network interface 205, for example. Subsequently, during output packet processing, the shared memory manager 220 retrieves the packet from the external shared memory 230 and deallocates buffers that are no longer in use. To assure no buffers are released until all output ports have completed transmission of the data stored therein, the shared memory manager 220 preferably also tracks buffer ownership.

INPUT PORT/SWITCH FABRIC INTERFACE

Before describing the internal details of the switch fabric 210, the interface between the input ports (e.g., any port on which packets may be received) and the switch fabric 210 will now briefly be discussed. Input ports in each of the CPU interface 215, the network interface 205, and the cascading interface 225 request forwarding decisions for incoming packets from the switch fabric 210. According to one embodiment of the present invention, the following interface is employed:

(1) Fwd_Req[N:0]—Forward Request Signals

These forward request signals are output by the input ports to the switch fabric 210. They have two purposes. First, they serve as an indication to the switch fabric 210 that the corresponding input port has received a valid packet header and is ready to stream the packet header to the switch fabric. A header transfer grant signal (see Hdr_Xfr_Gnt[N:0] below) is expected to be asserted before transfer of the packet header will begin. Second, these signals serve as a request for a forwarding decision after the header transfer grant is detected. The forward request signals are deasserted in the clock period after a forwarding decision acknowledgment is detected from the switch fabric 210 (see Fwd_Ack[N:0] below).

(2) Hdr_Xfr_Gnt[N:0]—Header Transfer Grant Signals

These header transfer grant signals are output by the switch fabric 210 to the input ports. More specifically, these signals are output by the switch fabric's header preprocessing logic that will be described further below. At any rate, the header transfer signal indicates the header preprocessing logic is ready to accept the packet header from the corresponding input port. Upon detecting the assertion of the header transfer grant, the corresponding input port will begin streaming continuous header fields to the switch fabric 210.

(3) Hdr_Bus[X:1][N:0]—The Dedicated Header Bus

The header bus is a dedicated X-bit wide bus from each input port to the switch fabric 210. In one embodiment, X is 16, thereby allowing the packet header to be transferred as double bytes.

(4) Fwd_Ack[N:0]—Forwarding Decision Acknowledgment Signals

These forwarding decision acknowledgment signals are generated by the switch fabric 210 in response to corresponding forwarding request signals from the input ports (see Fwd_Req[N:0] above). These signals are deasserted while the forwarding decision is not ready. When a forwarding decision acknowledgment signal does become asserted, the corresponding input port should assume the forwarding decision bus (see Fwd_Decision[Y:0] below) has a valid forwarding decision. After detecting its forwarding decision acknowledgment, the corresponding input port may make another forwarding request, if needed.

(5) Fwd_Decision[Y:0]—Shared Forwarding Decision Bus

This forwarding decision bus is shared by all input ports. It indicates the output port number(s) on which to forward the packet. The forwarding decision may also include data indicative of the outgoing packet's priority, VID insertion, DA replacement, and other information that may be useful to the input ports.

SWITCH FABRIC OVERVIEW

Figure 3:
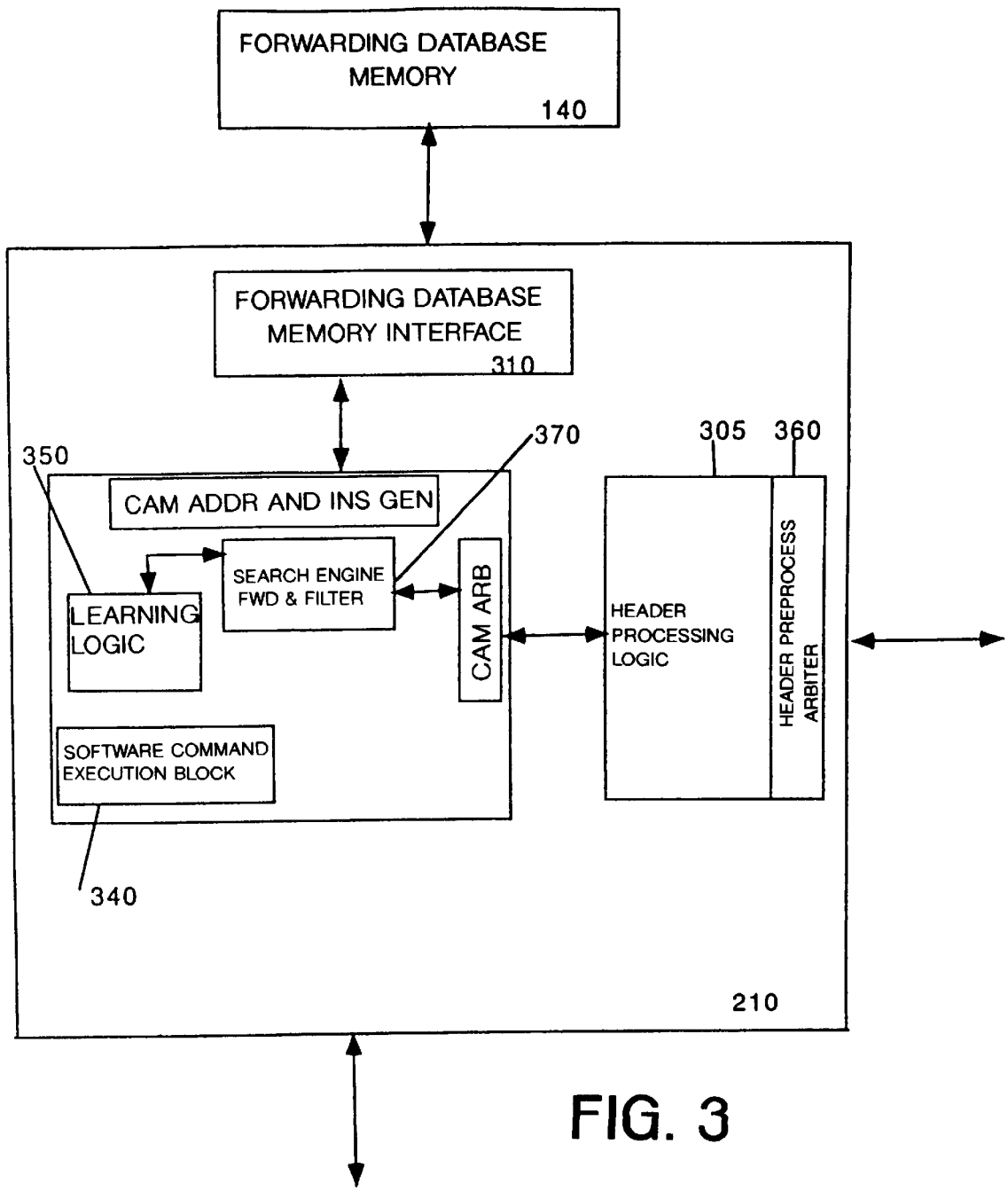
FIG. 3 is a block diagram of the switch fabric of FIG. 2 according to one embodiment of the present invention.

Having described the interface between the input ports and the switch fabric 210, the internal details of the switch fabric 210 will now be described. Referring to FIG. 3, a block diagram of an exemplary switch fabric 210 is depicted. In general, the switch fabric 210 is responsible for directing packets from an input port to an output port. The goal of the switch fabric 210 is to generate forwarding decisions to the input ports in the shortest time possible to keep the delay though the switch low and to achieve wire speed switching on all ports. The primary functions of the switch fabric are performing real-time packet header matching, Layer 2 (L2) based learning, L2 and Layer 3 (L3) aging, forming L2 and L3 search keys for searching and retrieving forwarding information from the forwarding database memory 140 on behalf of the input ports, and providing a command interface for software to efficiently manage entries in the forwarding database memory 140.

Layer 2 based learning is the process of constantly updating the MAC address portion of the forwarding database 140 based on the traffic that passes through the switching device. When a packet enters the switching device, an entry is created (or an existing entry is updated) in the database that correlates the MAC source address (SA) of the packet with the input port upon which the packet arrived. In this manner, a switching device "learns" on which subnet a node resides.

Aging is carried out on both link and network layers. It is the process of time stamping entries and removing expired entries from the forwarding database memory 140. There are two types of aging: (1) aging based on MAC SA, and (2) aging based on MAC destination address (DA). The former is for Layer 2 aging and the latter aids in removal of inactive Layer 3 flows. Thus, aging helps reclaim inactive flow space for new flows. At predetermined time intervals, an aging field is set in the forwarding database entries. Entries that are found during MAC SA or MAC DA searching will have their aging fields cleared. Thus, active entries will have an aged bit set to zero, for example. Periodically, software or hardware may remove the inactive (expired) entries from the forwarding database memory 140; thereby allowing for more efficient database management. Aging also enables connectivity restoration to a node that has "moved and kept silent" since it was learned. Such a node can only be reached through flooding.

Before discussing the exemplary logic for performing search key formation, the process of search key formation will now briefly be described. According to one embodiment of the present invention, packets are broadly categorized in one of two groups, either L2 entries or L3 entries. The L3 entries may be further classified as being part of one of several header classes. Exemplary header classes include: (1) an Address Resolution Protocol (ARP) class indicating the packet header is associated with an ARP packet; (2) a reverse ARP (RARP) class indicating the packet header is associated with a RARP packet; (3) a PIM class indicating the packet header is associated with a PIM packet; (4) a Reservation Protocol (RSVP) class indicating the packet header is associated with an RSVP packet; (5) an Internet Group Management Protocol (IGMP) class indicating the packet header is associated with a IGMP packet; (6) a Transmission Control Protocol (TCP) flow class indicating the packet header is associated with a TCP packet; (7) a non-fragmented User Datagram Protocol (UDP) flow class indicating the packet header is associated with a non-fragmented UDP packet; (8) a fragmented UDP flow class indicating the packet header is associated with a fragmented UDP packet; (9) a hardware routable Internet Protocol (IP) class indicating the packet header is associated with a hardware routable IP packet; and (10) an IP version six (IP V6) class indicating the packet header is associated with an IP V6 packet.

In one embodiment of the present invention, search keys are formed based upon an encoding of the header class and selected information from the incoming packet's header. L2 search keys may be formed based upon the header class, the L2 address and the VID. L3 search keys may be formed based upon the header class, an input port list, and selectable L3 header fields based upon the header class, for example. Masks may be provided on a per header class basis in local switch element 100 memory to facilitate the header field selection, in one embodiment.

In the embodiment depicted in FIG. 3, the switch fabric 210 includes a header preprocess arbiter 360, packet header preprocessing logic 305, a search engine 370, learning logic 350, a software command execution block 340, and a forwarding database memory interface 310.

The header preprocess arbiter 360 is coupled to the packet header preprocessing logic 305 and to the input ports of the network interface 205, the cascading interface 225, and the CPU interface 215. The input ports transfer packet headers to the switch fabric 210 and request forwarding decisions in the manner described above, for example.

The switch fabric 210 may support mixed port speeds by giving priority to the faster network links. For example, the header preprocess arbiter 360 may be configured to arbitrate between the forwarding requests in a prioritized round robin fashion giving priority to the faster interfaces by servicing each fast interface (e.g., Gigabit Ethernet port) for each N slower interfaces (e.g., Fast Ethernet ports).

Upon selecting a forward request to service, the header preprocess arbiter 360 transfers the corresponding packet header to the header preprocess logic 305. The header preprocessing logic 305 performs L2 encapsulation filtering and alignment, and L3 header comparison and selection logic.

The search engine 370 is coupled to the forwarding database memory interface 310 for making search requests and to the header preprocessing logic 305 for information for generating search keys. The search engine 370 is also coupled to the learning logic 350 to trigger the learning processing. The search engine 370 contains logic for scheduling and performing accesses into the forwarding database memory 140 and executes the forward and filter algorithm including performing search key formation, merging L2 and L3 results retrieved from the forwarding database memory 140, filtering, and generating forwarding decisions to the requesting input ports, etc. For purposes of learning, updated forwarding database entry information such as a cleared age bit or a modified output port list, is provided by the learning logic 350 at the appropriate time during the searching cycle for update of the forwarding database memory 140. Finally, as will be discussed further below, when search results become available from the forwarding database memory 140, the search engine 370 generates and transfers a forwarding decision to the requesting input port.

The forwarding database memory interface 310 accepts and arbitrates access requests to the forwarding database memory 140 from the search engine 370 and the software command execution block 340.

The software command execution block 340 is coupled to the CPU bus. Programmable command, status, and internal registers may be provided in the software command execution block 340 for exchanging information with the CPU 161. Importantly, by providing a relatively small command set to the CPU, the switch fabric 210 shields the CPU from the tens or hundreds of low-level instructions that may be required depending upon the forwarding database memory implementation. For example, in an architecture providing the CPU with direct access to a content addressable memory, for example, a great deal of additional software would be required to access the forwarding database memory. This additional software would be unnecessarily redundant, in light of the fact that the switch fabric 210 already has knowledge of the forwarding database memory 140 interface.

Additional efficiency considerations are also addressed by the present invention with respect to architectures having distributed forwarding databases. For example, in a distributed architecture, it may be desirable to keep an image of the entire forwarding database in software. If this is the case, presumably, periodically the software will need to read all entries from each of the individual forwarding databases. Since the forwarding database(s) may be very large, many inefficient programmed input/outputs (PIOs) may be required by an architecture providing the CPU with direct access to the forwarding database(s).

Thus, it would be advantageous to employ the switch fabric 210 as an intermediary between the CPU 161 and the forwarding database 140 as discussed herein. According to one embodiment of the present invention, the software command execution block 340 may provide a predetermined set of commands to the software for efficient access to and maintenance of the forwarding database memory 140. The predetermined set of commands described below have been defined in such a way so as to reduce overall PIOs. These commands as well as the programmable registers will be discussed in further detail below.

An exemplary set of registers includes the following: (1) a command and status register for receiving commands from the CPU 161 and indicating the status of a pending command; (2) a write new entry register for temporarily storing a new entry to be written to the forwarding database 140; (3) a write key register for storing the key used to locate the appropriate forwarding database entry; (4) a write data register for storing data to be written to the forwarding database 140; (5) an address counter register for storing the location in the forwarding database memory to read or update; (6) a read entry register for storing the results of a read entry operation; and (7) a read data register for storing the results of other read operations.

In one embodiment of the present invention, an address counter register is used to facilitate access to the forwarding database memory 140. The software only needs to program the address register with the start address of a sequence of reads/writes prior to the initial read/write of the sequence. After the initial memory access, the address register will be automatically incremented for subsequent accesses. Advantageously, in this manner, additional PIOs are saved, because the software is not required to update the address prior to each memory access.

The software command execution block 340 is further coupled to the forwarding database memory interface 310. Commands and data are read from the programmable registers by the software command execution block 340 and appropriate forwarding database memory access requests and events are generated as described in further detail with reference to FIG. 9. The software command execution block 340 may also provide status of the commands back to the software via status registers. In this manner, the software command execution block 340 provides hardware assisted CPU access to the forwarding database memory 140.

PACKET HEADER PROCESSING

Figures 4, 5:
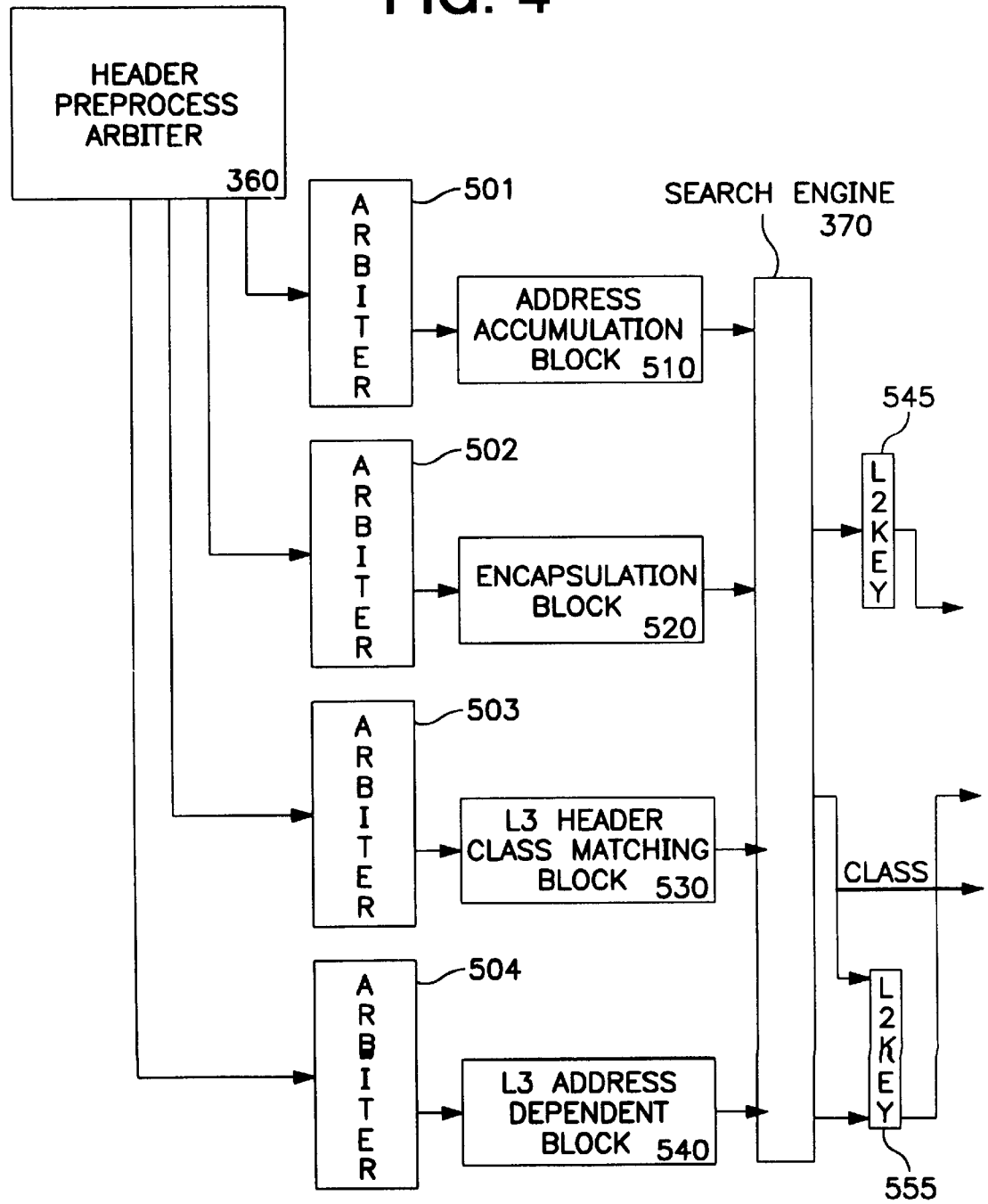
FIG. 4 illustrates the portions of a generic packet header that are operated upon by the pipelined header preprocessing subblocks of FIG. 5 according to one embodiment of the present invention.
FIG. 5 illustrates pipelined header preprocessing subblocks of the header processing logic of FIG. 3 according to one embodiment of the present invention.

FIG. 4 illustrates the portions of a generic packet header that are operated upon by the pipelined header preprocessing subblocks of FIG. 5 according to one embodiment of the present invention. According to this embodiment, a packet header 499 is partitioned into four portions, an L2 header portion 475, an L2 encapsulation portion 480, an L3 address independent portion 485, and an L3 address dependent portion 490.

In this example, the L2 header portion 475 may comprise a MAC SA field and a MAC DA field. Depending upon the type of encapsulation (e.g., IEEE 802.1Q tagged or LLC-SNAP), the L2 encapsulation portion may include a virtual local area network (VLAN) tag or an 802.3 type/length field and an LLC SNAP field. The L3 address independent portion 485 may comprise an IP flags/fragment offset field and a protocol field. Finally, the L3 address dependent portion 490 may comprise an IP source field, an IP destination field, a TCP source port, and a TCP destination port. Note that the relative position of fields in the L3 address independent portion 485 and the L3 address dependent portion 490 may be different depending upon the type of encapsulation in the L2 encapsulation portion 480.

FIG. 5 illustrates pipelined header preprocessing subblocks according to one embodiment of the present invention. According to this embodiment, the header preprocessing logic 305 may be implemented as a four stage pipeline. Each stage in the pipeline operates on a corresponding portion of the packet header 499. The pipeline depicted includes four stage arbiters 501–504, an address accumulation block 510, an encapsulation block 520, an L3 header class matching block 530, and an L3 address dependent block 540. In this example, the header preprocessing logic 305 may simultaneously process packet headers from four input ports. For example, the address accumulation block 510 may be processing the L2 header portion 475 of a packet from a first input port, the encapsulation block 520 may be processing the L2 encapsulation portion 480 of a packet from a second input port, the L3 header class matching block 530 may be processing the L3 address independent portion 485 of a third input port, and the L3 address dependent block 540 may be processing the L3 address dependent portion 490 of a packet from a forth input port.

Importantly, while the present embodiment is illustrated with reference to four pipeline stages, it is appreciated that more or less stages may be employed and different groupings of packet header information may be used. The present identification of header portions depicted in FIG. 4 has been selected for convenience. The boundaries for these header portions 475–490 are readily identifiable based upon known characteristics of the fields within each of the exemplary header portions 475–490. Further, the header portions 475–490 can be processed in approximately equal times.

In any event, continuing with the present example, the arbiters 501–504 coordinate access to the stages of the pipeline. The arbiters 501–504 function so as to cause a given packet to be sequentially processed one stage at a time starting with the address accumulation block 510 and ending with the L3 address dependent block 540. The first stage of the pipeline, the address accumulation block 510, is configured to extract the MAC SA and MAC DA from the L2 header portion 475 of the packet header. The address accumulation block 510 then transfers the extracted information to the search engine for use as part of the L2 search key 545.

The encapsulation block 520 is configured to determine the type of encapsulation of the L2 encapsulation portion 480 of the packet header. As indicated above, the relative positioning of fields following the L2 encapsulation portion varies depending upon the type of encapsulation employed. Therefore, the encapsulation block further calculates an offset from the start of the L2 encapsulation portion 480 to the start of the L3 address independent portion 485. The offset may then be used by the subsequent stages to align the packet header appropriately.

The L3 header class matching block 530 is configured to determine the class of the L3 header by comparing the packet header to a plurality of programmable registers that may contain predetermined values known to facilitate identification of the L3 header class. Each programmable register should be set such that only one header class will match for any given packet. Once a given register has been determined to match, a class code is output to the search engine for use as part of the L3 search key.

The L3 address dependent block 540 is configured to extract appropriate bytes of the L3 address dependent portion 490 for use in the L3 search key 555. This extraction may be performed by employing M CPU programmable byte and bit masks, for example. The programmable byte and bit mask corresponding to the header class, determined by the L3 header class matching block 530, may be used to mask off the desired fields. Advantageously, pipelining the header preprocess logic 305 saves hardware implementation overhead. For example, multiple packet headers may be processed simultaneously in a single processing block rather than four processing blocks that would typically be required to implement the logic of FIG. 5 in a non-pipelined fashion. Note that additional parallelism may be achieved by, further pipelining the above header preprocessing with forwarding database memory 140 accesses. For example, there is no need for L2 searching to wait for a packet to complete the pipeline of FIG. 5, L2 searches may be initiated as soon as a packet header completes the first stage and an L2 search key becomes available from the search engine 370. Subsequent L2 searches may be initiated as new L2 search keys become available and after the previous forwarding database memory access has completed.

FORWARDING DATABASE MEMORY

Figure 6:
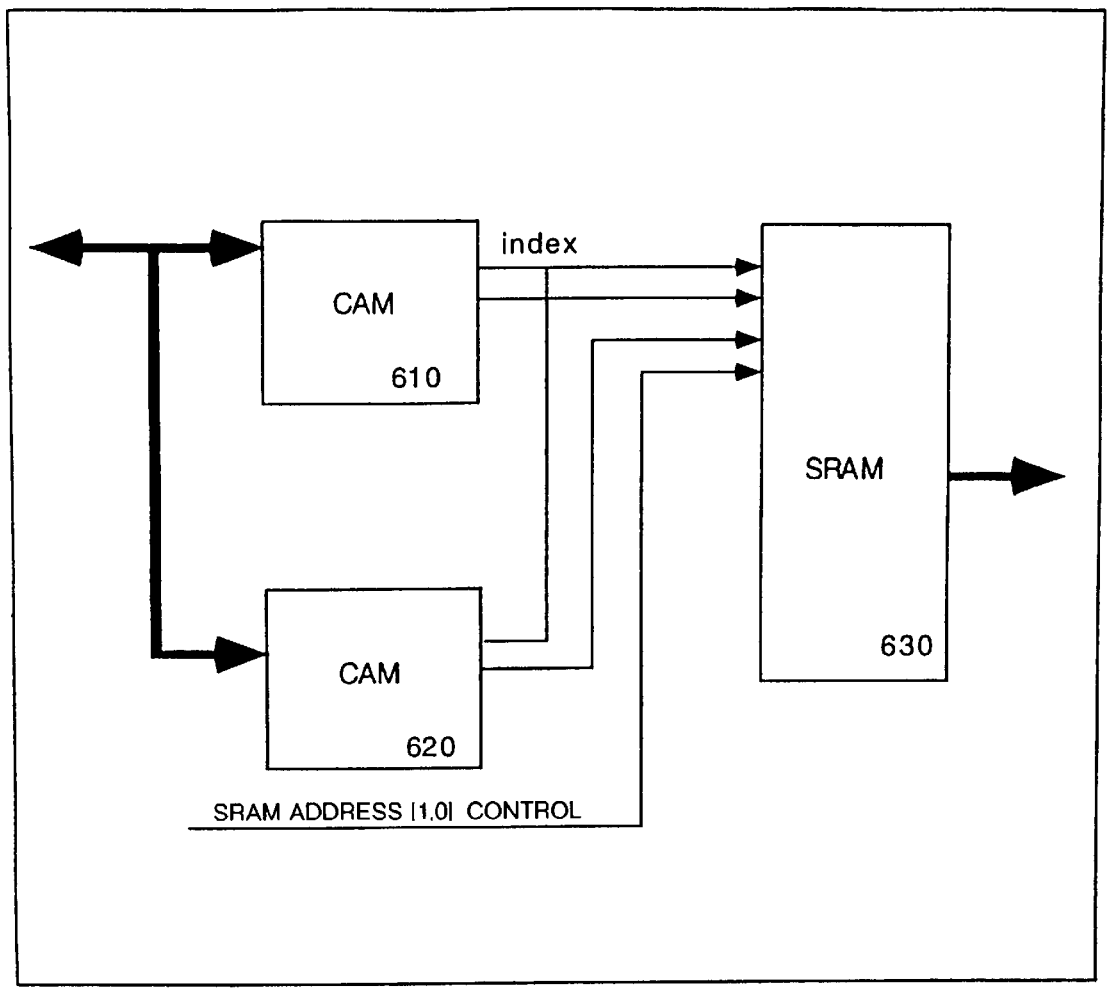
FIG. 6 illustrates a physical organization of the forwarding memory of FIG. 2 according to one embodiment of the present invention.

FIG. 6 illustrates a physical organization of the forwarding database memory of FIG. 2 according to one embodiment of the present invention. In the embodiment depicted, the forwarding database memory 140 includes two cascaded fully associative content addressable memories (CAMs), 610 and 620, and a static random access memory (SRAM) 630.

The switch fabric 210, in collaboration with the CPU 161, maintains a combined link layer (also referred to as "Layer 2") and network layer (also referred to as "Layer 3") packet header field-based forwarding and filtering database 140. The forwarding and filtering database 140 is stored primarily in off-chip memory (e.g., one or more CAMs and SRAM) and contains information for making real-time packet forwarding and filtering decisions.

The assignee of the present invention has found it advantageous to physically group Layer 2 (L2) entries and Layer 3 (L3) entries together. Therefore, at times the group of L2 entries may be referred to as the "L2 database" and the group of L3 entries may be logically referred to as the "L3 database." However, it is important to note that the L2 database and L3 database may span CAMs. That is, either CAM may contain L2 and/or L3 entries. Both Layer 2 and Layer 3 forwarding databases are stored in the CAM-RAM chip set. For convenience, the data contained in the CAM portion of the forwarding database memory 140 will be referred to as "associative data," while the data contained in the SRAM portion of the forwarding database memory 140 will be referred to as "associated data."

As will be explained further below, entries may be retrieved from the L2 database using a key of a first size and entries may be retrieved from the L3 database using a key of a second size. Therefore, in one embodiment, the switching element 100 may mix CAMs of different widths. Regardless of the composition of the forwarding database memory 140, the logical view to the switch fabric 210 and the CPU 161 should be a contiguous memory that accepts bit match operations of at least two different sizes, where all or part of the memory is as wide as the largest bit match operation.

Different combinations of CAMs are contemplated. CAMs of different widths, and different internal structures (e.g., mask per bit (MPB) vs. global mask) may be employed. In some embodiments, both CAMs 610 and 620 may be the same width, while in other embodiments the CAMs 610 and 620 may have different widths. For example, in one embodiment, both CAMs 610 and 620 may be 128-bits wide and 2K deep or the first CAM 610 may be 128-bits wide and the second CAM 620 may be 64-bits wide. Since L2 entries are typically narrower than L3 entries, in the mixed CAM width embodiments, it may be advantageous to optimize the narrower CAM width for L2 entries. In this case, however, only L2 entries can be stored in the narrower CAM. However, both L2 and L3 entries may still reside in the wider CAM.

While the present embodiment has been described with reference to cascaded dual CAMs 610 and 620, because the logical view is one contiguous block, it is appreciated that the L2 and L3 databases may use more or less CAMs than depicted above. For example, the L2 and L3 databases may be combined in a single memory in alternative embodiments.

Having described an exemplary physical organization of the forwarding database memory 140, the data contained therein will now briefly be described. One or more lines of the SRAM 630 may be associated with each entry in the CAM portion. It should be noted that a portion of the CAM could have been used as RAM. However, one of the goals of partitioning the associative data and the associated data is to produce a minimum set of associative data for effective searching while storing the rest of the associated data in a separate memory, a cheaper RAM, for example. As will be discussed below, with respect to FIGS. 8A–C, separating the associative data and the associated data allows the forwarding database memory 140 to be more efficiently searched and updated. Additional advantages are achieved with an efficient partitioning between associative data and associated data. For example, by minimizing the amount of data in the associative data fields, less time and resources are required for access and maintenance of the forwarding database such as the occasional shuffling of L3 entries that may be performed by the CPU 161. Additionally, the efficient partitioning reduces the amount of time required for the occasional snap shots that may be taken of the entire forwarding database for maintenance of the aggregate copy of forwarding databases in the central memory 163.

Generally, the associative data is the data with which the search key is matched. Packet address information is typically useful for this purpose. In one embodiment, the associative data may contain one or more of the following fields depending upon the type of entry (e.g., L2 or L3):

(1) a class field indicating the type of associative entry;

(2) a media access control (MAC) address which can be matched to an incoming packet's MAC DA or SA field;

(3) a virtual local area network (VLAN) identifier (VID) field (4) an Internet Protocol (IP) destination address;

(5) an IP source address;

(6) a destination port number for TCP or non-fragmented UDP flows;

(7) a source port number for TCP or non-fragmented UDP flows; and (8) an input port list for supporting efficient multicast routing.

The associative data may also contain variable bits of the above by employing a mask per bit (MPB) CAM as described above.

The associated data generally contains information such as an indication of the output port(s) to which the packet may be forwarded, control bits, information to keep track of the activeness of the source and destination nodes, etc. Also, the associated data includes the MAC address for MAC DA replacement and the VID for tagging. Specifically, the associated data may contain one or more of the following fields:

(1) a port mask indicating the set of one or more ports the packet may be forwarded to;

(2) a priority field for priority tagging and priority queuing.

(3) a best effort mask indicating which ports should queue the packet as best effort;

(4) a header only field indicating that only the packet header should be transferred to the CPU;

(5) a multicast route field for activating multicast routing;

(6) a next hop destination address field defining the next hop L2 DA to be used to replace the original DA;

(7) a new VID field that may be used as a new tag for the packet when routing between VLANs requires an outgoing tag different than the incoming tag, for example;

(8) a new tag field indicating that the new VID field should be used;

(9) an aged source indication for determining which L2 entries are active in the forwarding database, and which may be removed;

(10) an aged destination indication for implementing IEEE 802.1d type address aging to determine which L2 or L3 entries are active in the forwarding database, and which may be removed.

(11) an L2 override indication for instructing the merge function to use the L2 result for forwarding even when an L3 result is available;

(12) a static indication for identifying static entries in the forwarding database that are not subject to automatic L2 learning or aging;

(13) a distributed flow indication for use over internal (cascading) links to control the type of matching cycle (L2 or L3) used on the next switching element; and

(14) a flow rate count for estimating the arrival rate of an entry or group of entries.

FORWARDING DATABASE SEARCH SUPERCYCLE DECISION FLOW

Figure 7B:
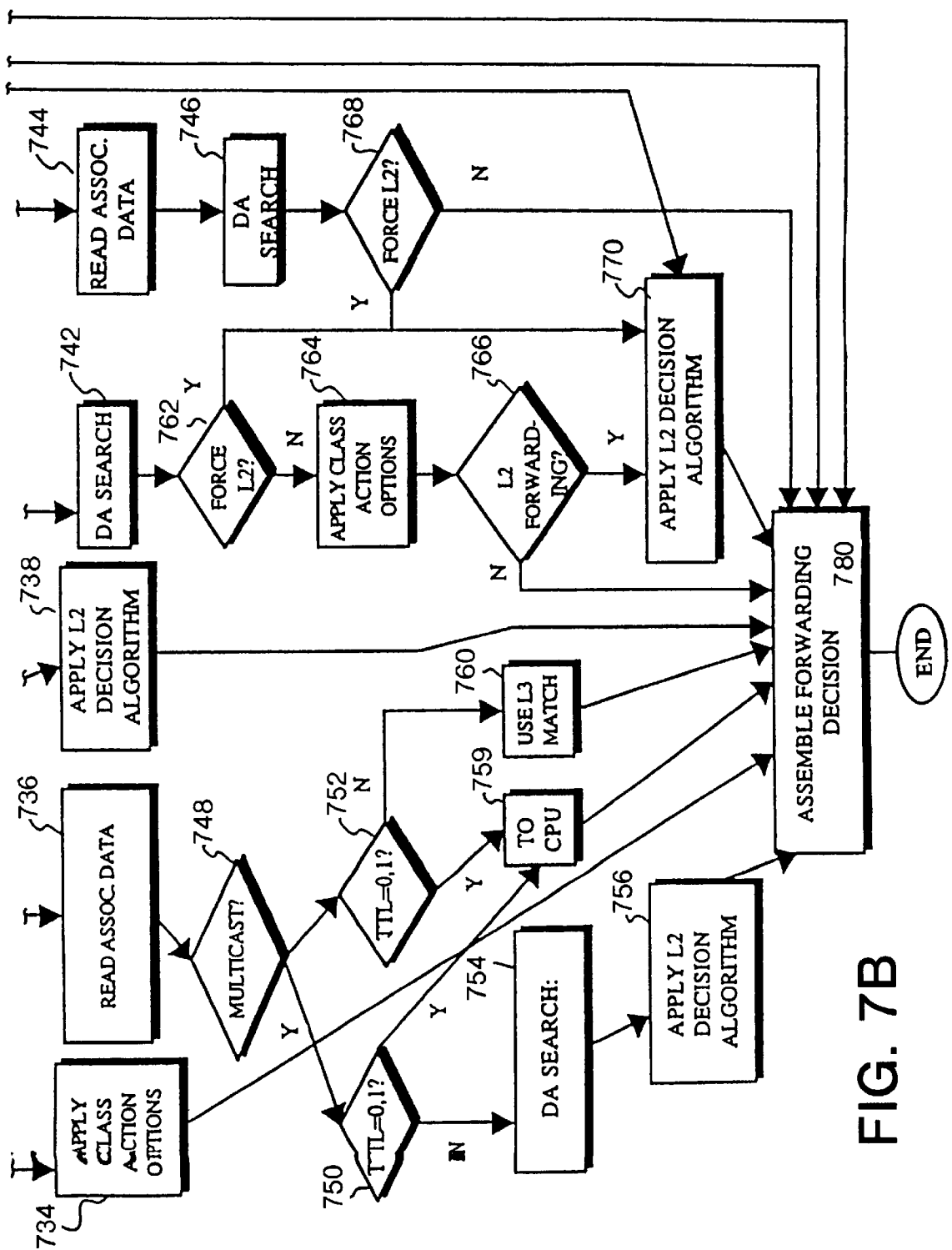
FIG. 7 is a flow diagram illustrating the forwarding database memory search supercycle decision logic according to one embodiment of the present invention.

FIG. 7 is a flow diagram illustrating the forwarding database memory search supercycle decision logic according to one embodiment of the present invention. At step 702, depending upon whether the packet is being received on an internal link or an external link, processing continues with step 704 or step 706, respectively.

Internal link specific processing includes steps 704, 712, 714, 720, 722, and 724. At step 704, since the packet has been received from an internal link, a check is performed to determine if the packet is part of a distributed flow. If so, processing continues with step 714. If the packet is not part of a distributed flow, then processing continues with step 712.

No learning is performed for the internal links, therefore, at step 712, only a DA search is performed on the forwarding database memory 140

At step 714, an L3 search is performed to retrieve a forwarding decision for the incoming packet. At step 720, a determination is made as to whether a matching L3 entry was found during the search of step 714. If not, then, at step 722, the class action defaults are applied (e.g., forwarding the packet or the packet header to the CPU 161) and processing continues at step 780. If a matching L3 was found, then, at step 724, the associated data corresponding to the matching entry is read from the forwarding database 140 and processing continues at step 780.

At step 708, Layer 2 learning is performed. After the learning cycle the header class is determined and, at step 716, the header class is compared against the L3 unicast route header class. If there is a match at step 716, processing continues with step 726; otherwise, another test is performed at step 718. At step 718, the header class is compared to the remaining L3 header classes.

Specific processing for packets associated with headers classified as L2 includes steps 728 and 738. If the header class was determined not to be an L3 header class, then at step 728, a DA search is performed for an L2 forwarding decision. At step 738, the L2 decision algorithm is applied and processing continues at step 780.

Specific processing for packets associated with headers classified as L3 route includes steps 726, 732, 734, 736, 748, 750, 754, 756, 752, 758, and 760. At step 726, an L3 search is performed on the forwarding database 140. If a matching L3 entry is found (step 732), then the associated data corresponding to the matching entry is read from the forwarding database 140 (step 736). Otherwise, at step 734, the class action options are applied and processing continues with step 780.

If the packet is a multicast packet (step 748), then the Time_To_Live (TTL) counter is tested against zero or one (step 750), otherwise processing continues at step 752. If TTL was determined to be zero or one, in step 750, then the packet is forwarded to the CPU 161 prior to continuing with step 780. Otherwise, at step 754, a destination address search is performed to retrieve an L2 forwarding entry from the forwarding database 140 and the L2 decision algorithm is applied (step 756).

If the packet was determined to be a unicast packet in step 748, then TL is tested against zero or one (step 752). If TTL was determined to be zero or one, then the packet is forwarded to the CPU 161. Otherwise the L3 match is employed at step 760 and processing continues with step 780.

Specific processing for packets associated with headers classified as L3 includes steps 730, 740, 742, 762, 764, 766, 744, 746, 768, and 770. At step 730, an L3 search is requested from the forwarding database 140. If a matching L3 entry is found (step 740), then the associated data corresponding to the matching entry is read from the forwarding database 140 (step 744). Otherwise, when no matching L3 entry is found, at step 742 a DA search is performed to find a matching L2 entry in the forwarding database 140.

If the forwarding decision indicates the L2 decision should be used (step 762), then the L2 decision algorithm is applied at step 770. Otherwise, the class action options are applied (step 764). If the class action options indicate the packet is to be forwarded using the L2 results (step 766), then processing continues at step 770. Otherwise, the processing branches to step 780.

At step 746, a destination address search is performed on the forwarding database 140 using the packet's destination address. If the forwarding decision indicates the L2 decision should be used (step 768), then processing continues with step 770. Otherwise, the associated data retrieved at step 744 will be employed and processing continues with step 780. At step 770, the L2 decision algorithm is applied and processing continues with step 780. Finally, the forwarding decision is assembled (step 780).

As illustrated by FIG. 7, packet processing for packets arriving on external links typically requires two to four associative lookups (i.e., two or more of the following: L2 SA match, L2 learning, Unicast route class match, L2 DA match). However, according to an embodiment of the present invention, the L2 DA match may be eliminated whenever a port update access is needed for L2 learning. Thus, conserving valuable cycles. While the elimination of the L2 DA match may result in flooding one extra packet when a topology change occurs, the port update access is a relatively rare event. Advantageously, in this manner, the number of associative lookups is normally limited to a maximum of three per packet, without compromising functionality.

FORWARDING DATABASE SEARCH SUPERCYCLE TIMING

The search supercycle timing will now be described in view of the novel partitioning of forwarding information within the forwarding database 140 and the pipelined forwarding database access.

Figure 8A:
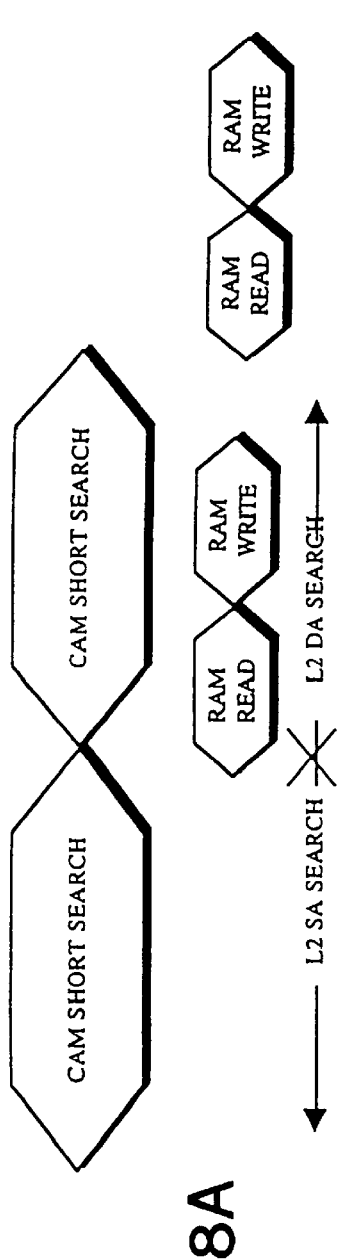
FIGS. 8A–C are timing diagrams illustrating three exemplary forwarding database memory search supercycles.
Figure 8B:
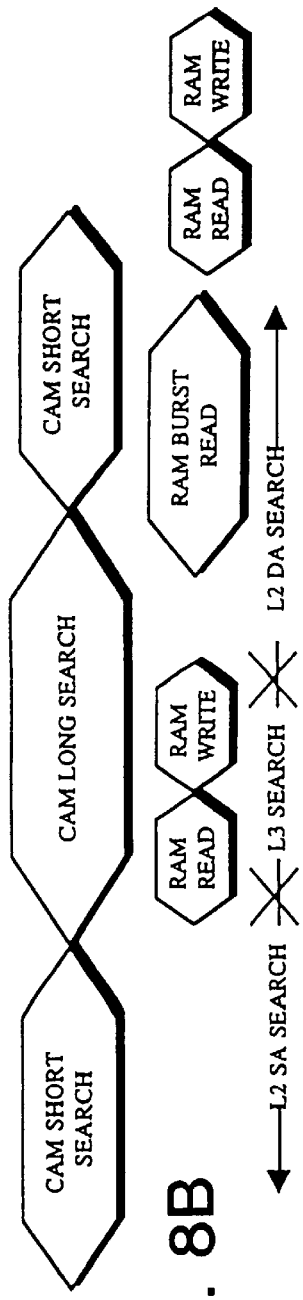
Figure 8C:
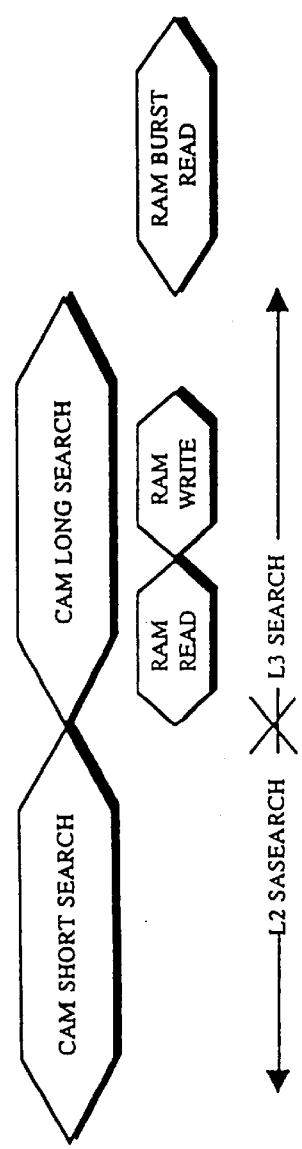

FIGS. 8A–C are timing diagrams illustrating the three worst case content addressable memory search supercycles. Advantageously, the partitioning of data among the CAM-RAM architecture described with respect to FIG. 4 allows forwarding database memory accesses to be pipelined. As should be appreciated with reference to FIGS. 8A–C, the switch fabric saves valuable cycles by hiding RAM reads and writes within CAM accesses. For example, RAM reads and writes can be at least partially hidden within the slower CAM accesses for each of the supercycles depicted.

Referring now to FIG. 8A, a search supercycle including an L2 SA search and an L2 DA search is depicted. The first CAM short search represents the L2 SA search of the CAMs 410 and 420 for purposes of L2 learning. As soon as the L2 SA search has completed, the associated data in the SRAM 630 may immediately be updated (e.g., RAM read and RAM write) while the next CAM short search (L2 DA search) is taking place.

FIG. 8B illustrates a case in which L2 and L3 searches are combined. The first CAM short search represents an L2 SA search. The CAM long search represents a search of the forwarding database 140 for a matching L3 entry. Again, upon completion of the L2 SA search if learning is required, the SRAM read and write may be performed during the following CAM access. If a matching L3 entry is found, then the RAM burst read of the associated data corresponding to the matching entry can be performed during the second CAM short search which represents an L2 DA search.

FIG. 8C illustrates another case in which L2 and L3 searches are combined. However, in this case, the second CAM access is not performed.

It should be appreciated that the pipelining of the CAM and SRAM effectively decouples the speed of the memories. Further, the partitioning between the CAM(s) and the SRAM should now be appreciated. Because CAM accesses are slower than the accesses to the SRAM, it is desirable to allocate as much of the forwarding information as possible to the SRAM.

Observing the gaps between the completion of the RAM writes and the completion of the second CAM access, it is apparent that increasing the speed of the CAM(s) can reduce these gaps. The assignee of the present invention anticipates future technological developments to allow faster CAMs to be developed, thereby creating additional resources for additional or faster ports, for example.

While only the pipelined forwarding database access is illustrated in FIGS. 8A–C, it is important to note there are many other contributions to the overall speed of the switch fabric 210 of the present invention. For example, as described above, the highly pipelined switch fabric logic includes: pipelined header processing, pipelined forwarding database access, and pipelined forwarding database/header processing.

GENERALIZED COMMAND PROCESSING

Figure 9:
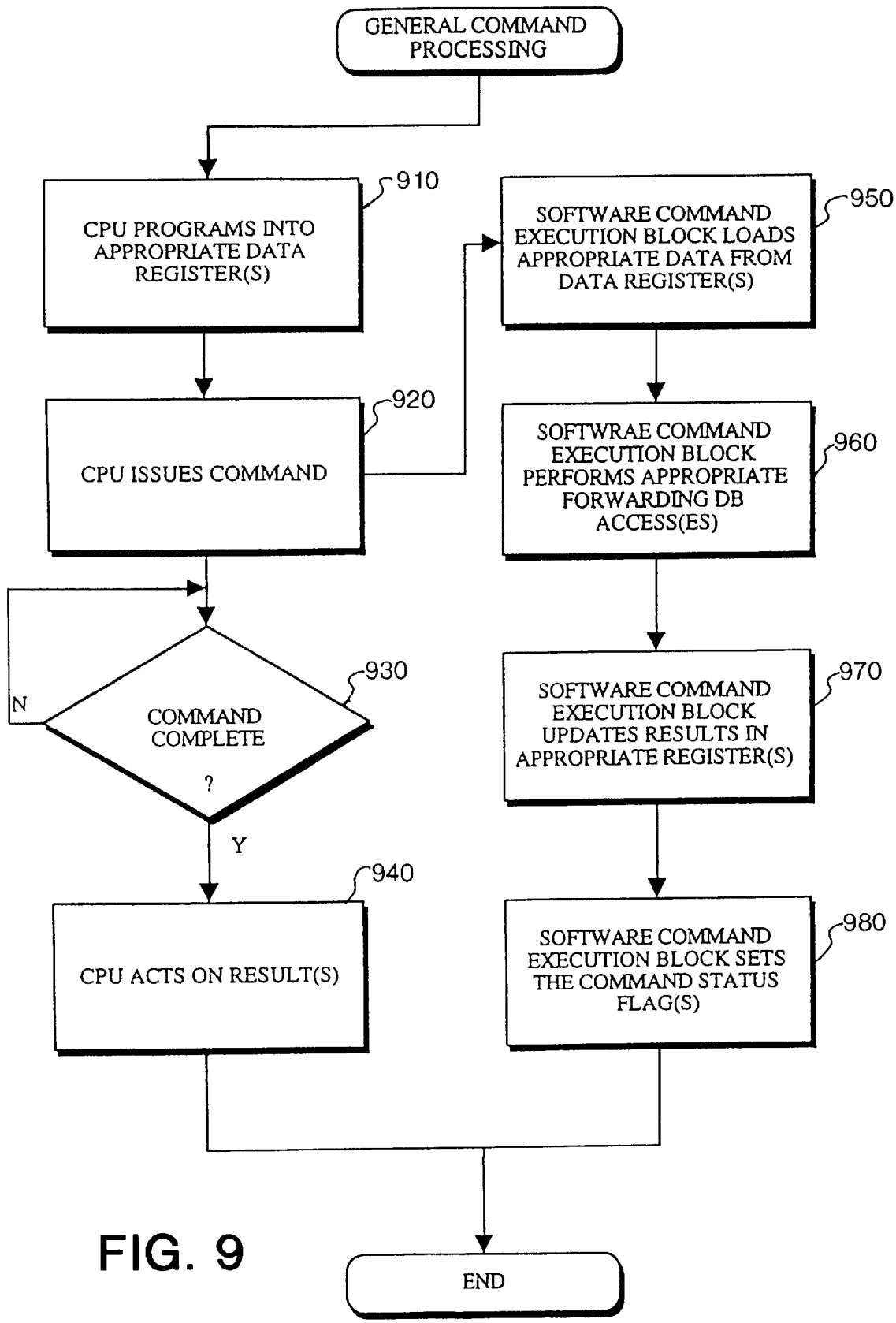
FIG. 9 is a flow diagram illustrating generalized command processing for typical forwarding database memory access commands according to one embodiment of the present invention.

Having described an exemplary environment in which one embodiment of the present invention may be implemented, the general command processing will now be described. FIG. 9 is a flow diagram illustrating generalized command processing for typical forwarding database memory access commands according to one embodiment of the present invention. At step 910, the CPU programs appropriate data registers in the software command execution block 340 using PIOs. For example, certain forwarding database access commands are operable upon a specified address that should be supplied by the CPU 161 prior to issuing the command.

At step 920, after the CPU 161 has supplied the appropriate parameters for the command, the CPU issues the desired command. This may be accomplished by writing a command code corresponding to the desired command to a command register.

According to the present embodiment, the CPU 161 polls a status register until the command issued in step 920 is complete (step 930). Alternatively, since the commands have a predetermined maximum response time, the CPU 161 need not poll the status register, rather the CPU 161 is free to perform other functions and may check the status register at a time when the command is expected to be complete. Another alternative is to provide an interrupt mechanism for the switch fabric to notify the CPU 161 when the requested command is complete.

At step 940, after the command is complete, the CPU may act on the result(s). The results may be provided in memory mapped registers in the software command execution block 340, for example. In this case, the CPU 161 may retrieve the result(s) with a PIO read if necessary.

At step 950, the issuance of the command by the CPU 161 triggers logic in the software command execution block 340, for example, to load the appropriate command parameters. These command parameters are assumed to have been previously provided by the CPU 161 at step 910.

At step 960, the software command execution block 340 issues the appropriate forwarding database memory specific command(s) to perform the requested task. In this manner, the CPU 161 requires no knowledge of the underlying raw instruction set for the particular memory or memories used to implement the forwarding database 140.

At step 970, upon completion of the forwarding database 140 access, the software command execution block 340 updates the result(s) in appropriate interface registers. Then, at step 980, the software command execution block 340 sets one or more command status flag(s) to indicate to the CPU 161 that the command is complete. In other embodiments, one or more additional status flags may be provided to indicate whether or not the command completed successfully, whether or not an error occurred, and/or other information that may be useful to the CPU 161.

Having described the general command processing flow, an exemplary set of commands and their usage will now be described.

EXEMPLARY COMMAND SET

According to the present embodiment, one or more commands may be provided for accessing entries in the forwarding database 140. In particular, it may be useful to read a newly learned Layer 2 (L2) entry. To retrieve an L2 entry, the CPU 161 first programs counters in the switch fabric 210 for addressing the forwarding database memory 140. Subsequently, the CPU 161 writes the Read_CAM_Entry command to a command register in the switch fabric 210. When it is the CPU's turn to be serviced by the switch fabric, the switch fabric will read the counters and perform access the forwarding database memory 140 to retrieve the newly learned L2 entry. The switch fabric 210, then writes the L2 entry to an output register that is accessible by the CPU 161 and sets the command status done flag. After the command is complete, and assuming the command was successful, the CPU 161 may read the L2 entry from the output register.

The Read_CAM_Entry command in combination with the address counter register are especially useful for burst reads in connection with updating the software's image of the entire forwarding database, for example. Because the hardware will automatically increment the address counter register at the completion of each memory access. The software only needs to program the address register prior to the first memory access. In this manner, the software may read the entire forwarding database 140 very efficiently. Similarly, it will be apparent that other forwarding memory accesses are also simplified such as sequences of writes during L3 entry initialization. The mechanism for writing entries to the forwarding database memory 140 will now be described.

It is also convenient for the CPU 161 to be able to write an entry to the forwarding database memory. In particular, it may be useful to initialize all L3 entries in the forwarding database with a predetermined filler (or dummy) value. This command may also be useful for invalidation of L3 entries or before performing a mask update in a mask per bit (MPB) content associative memory (CAM), for example. A Write_CAM_Entry command is provided for this purpose. Again, the CPU 161 should first program the appropriate counters in the switch fabric 210. The CPU 161 also provides the L3 key to be written to the forwarding database memory 140. After these steps, the CPU 161 may issue the Write_CAM_Entry command using a PIO write to the command register. The CPU 161 may then begin polling the command status. The switch fabric 210 reads the parameters provided by the CPU 161 and initializes the corresponding L3 entry to a predetermined filler (or dummy). After the write is complete, the switch fabric 210 notifies the CPU 161 of the status of the command by setting the command status done flag.

Commands may also be provided for accessing associated data. According to one embodiment of the present invention the following operations are provided: (1) learning a supplied address; (2) reading associated data corresponding to a supplied search key; (3) aging forwarding database entries; (4) invalidating entries; (5) accessing mask data, such as mask data that may be stored in a MPB CAM, corresponding to a particular search key; and (6) replacing forwarding database entries.

L2 source address learning may be performed by a Learn_L2_SA command. First, the CPU 161 programs the appropriate registers in the switch fabric 210 with an L2 search key and a new entry to insert or a modified entry. Then, CPU 161 issues the Learn_L2_SA command and begins polling the command status. The switch fabric 210 reads the data provided by the CPU 161. If an entry is not found in the forwarding database 140 that matches the supplied address, then the new entry will be inserted into the forwarding database. After the insertion is complete or upon verifying a matching entry already exists, the switch fabric 210 notifies the CPU 161 of the status of the command by setting the command status done flag.

It is also convenient for the CPU 161 to be able to perform aging. In particular, it is useful to age L2 and L3 forwarding database entries. Age_SA and Age_NDA commands are provided for this purpose. The CPU 161 writes the appropriate key and the modified age field to the switch fabric interface. Then, CPU 161 issues either the Age_SA command or the Age_DA command. The Age_SA command sets the source address age field in the L2 entry corresponding to the provided search key. The Age_DA command sets the destination address age field for the L2 or L3 entry corresponding to the provided search key. After issuing the command, the CPU 161 may begin polling the command status. The switch fabric 210 reads the data provided by the CPU 161 and updates the appropriate age field in the matching entry. After aging is complete, the switch fabric 210 notifies the CPU 161 of the status of the command by setting the command status done flag.

The CPU 161 may also need to have the ability to invalidate forwarding database entries such as aged L2 entries, for example. The Invalidate_L2_Entry command is provided for this purpose. Prior to issuing the Invalidate_L2_Entry command, the CPU 161 programs the appropriate address counters in the switch fabric 210. After issuing the command, the CPU 161 may begin polling the command status. The switch fabric 210 reads the data provided by the CPU 161 and resets the validity bit at the address counter location specified. After the entry invalidation is complete, the switch fabric 210 notifies the CPU 161 of the status of the command by setting the command status done flag.

In embodiments employing MPB CAMs, typically the CAM stores alternating sets of data and masks. Each set of data has a corresponding mask. The masks allow programmable selection of portions of data from the corresponding CAM line. Thus, it is convenient for the CPU 161 to be able to access the mask data corresponding to a particular address in the CAM. In particular, it is useful to update the mask data to select different portions of particular CAM lines. The Update_Mask command is provided for this purpose. The CPU 161 programs the address counter register and programs the new mask into the appropriate register. Then, CPU 161 issues the Update_Mask command and may begin polling the command status. The switch fabric 210 reads the parameters provided by the CPU 161 and updates the mask data corresponding to the specified address. After the mask data update is complete, the switch fabric 210 notifies the CPU 161 of the status of the command by setting the command status done flag. The CPU 161 may also read mask data in a similar fashion by employing a Read_Mask command and providing the appropriate address.

Finally, it is desirable to be able to replace entries. Particularly, it is useful to replace filler (or dummy) L3 entries with new valid L3 entries. The Replace_L3 command is provided for this purpose. The CPU 161 provides an L3 search key to the switch fabric 210 and provides the new valid L3 entry. Then, the CPU 161 issues the Replace_L3 command and may begin polling the command status. The switch fabric 210 reads the parameters provided by the CPU 161 and performs a search of the forwarding database 140 for the matching L3 entry. After locating the matching L3 entry, the associated data corresponding to the matching entry is replaced with the new valid L3 entry provided by the CPU 161. After the L3 entry has been replaced, the switch fabric 210 notifies the CPU 161 of the status of the command by setting the command status done flag.

Importantly, while embodiments of the present invention have been described with respect to specific commands and detailed steps for executing particular commands, those of ordinary skill in the art will appreciate that the present invention is not limited to any particular set of commands or sequence of execution.

In the foregoing specification, the invention has been described with reference to specific embodiments thereof. It will, however, be evident that various modifications and changes may be made thereto without departing from the broader spirit and scope of the invention. For example, embodiments of the present invention have been described with reference to specific network protocols such as IP. However, the method and apparatus described herein are equally applicable to other types of network protocols. The specification and drawings are, accordingly, to be regarded in an illustrative rather than a restrictive sense.

What is claimed is:

1. A switch fabric comprising:
   a search engine for coupling to a forwarding database memory and a plurality of input ports, the search engine configured to schedule and perform accesses to the forwarding database memory and to transfer forwarding decisions to the plurality of input ports; and
   a header processing unit coupled to the search engine and having an arbitrated interface for coupling to the plurality of input ports, the header processing unit configured to receive a packet header from an input port of the plurality of input ports and to construct a first search key for accessing the forwarding database memory based upon a predetermined portion of the packet header, the predetermined portion of the packet header being selected based upon a class of a plurality of classes with which the packet header is associated.

2. The switch fabric of claim 1, wherein the header processing unit further comprises the following pipeline stages:
   an address accumulation unit, coupled to the plurality of input ports and the arbitrated interface, for accessing address information from the packet header;
   an encapsulation processing unit, coupled to the plurality of input ports and the arbitrated interface, for selecting a predetermined set of fields from the packet header to determine a type of encapsulation;
   a header class matching unit coupled to the plurality of input ports and the arbitrated interface, the header class matching including comparison logic to determine a header class based upon the type of encapsulation and a predetermined set of fields.

3. The switch fabric of claim 1, where in the first search key is a Layer 3 (L3) search key.

4. The switch fabric of claim 3, where the header processing unit is further configured to construct a Layer 2 (L2) search key for accessing the forwarding database memory.

5. The switch fabric of claim 1, where in the first search key is a Layer 2 (L2) search key.

6. The switch fabric of claim 1, wherein the plurality of input ports may each request for a forwarding decision independently of the others.

7. The switch fabric of claim 1, wherein the forwarding database memory comprises one or more content addressable memories (CAMs) coupled to a random access memory (RAM).

8. The switch fabric of claim 1, further including a command execution unit configured to interface with a processor, the command execution unit further configured to access the forwarding database memory on behalf of the processor.

9. The network device of claim 1, wherein the forwarding database memory comprises a first memory and a second memory and wherein the search engine is configured to pipeline accesses to the first memory and the second memory.

10. The switch fabric of claim 3, wherein the L2 search key is of a first size and the L3 search key is of a second size, the second size being greater than the first size.

11. A switch fabric comprising:
    a search engine for coupling to a forwarding database memory and a plurality of input ports, the search engine configured to schedule and perform accesses to the forwarding database memory and to transfer forwarding decisions to the plurality of input ports; and
    a header processing unit coupled to the search engine and having an arbitrated interface for coupling to the plurality of input ports, the header processing unit configured to receive a packet header from an input port of the plurality of input ports and to construct a first key and a second key for accessing a forwarding database memory, the first key comprising one or more fields from a first portion of the packet header and having a first length, the second key comprising one or more fields from a second portion of the packet header and having a second length.

12. The switch fabric of claim 11, wherein the first key is a Layer 2 (L2) key for retrieving an L2 entry from the forwarding database memory, the second key is a Layer 3 (L3) key for retrieving an L3 entry from the forwarding database memory.

13. The switch fabric of claim 12, wherein the first length is smaller than the second length.

14. The switch fabric of claim 12, wherein the first portion of the packet header comprises a media access control (MAC) header, and wherein the second portion of the packet header comprises an Internet Protocol (IP) header.

15. The switch fabric of claim 11, wherein the forwarding database memory comprises one or more content addressable memories (CAMs) coupled to a random access memory (RAM).

16. The switch fabric of claim 15, wherein an address for accessing the RAM includes an index produced by the one or more CAMs, and wherein the RAM contains both L2 and L3 forwarding information.

17. The switch fabric of claim 11, wherein the packet header includes an L2 header and an L3 header, and wherein the header processing unit comprises pipelined logic to allow processing of more than one packet header simultaneously, the pipeline logic including:
    an encapsulation block configured to determine the type of header encapsulation that has been employed in a first packet header and to determine an indication of the start of the L3 header based upon the type of header encapsulation; and
    an L3 header class matching block coupled to the encapsulation block for receiving the indication of the start of the L3 header, the L3 header class matching block configured to determine a class of a plurality of L3 classes with which a second packet header is associated based upon one or more fields in the L2 header and the L3 header.

18. A network device comprising:
    a plurality of ports including a first port for receiving a packet from a network;
    a forwarding memory including a first memory and a second memory, the first memory having stored therein an associative data entry corresponding to an the packet, the second memory coupled to the first memory and having stored therein an associated data entry corresponding to the associative data entry, the associative data entry including an indication of a set of ports to which the packet should be forwarded; and
    a search engine coupled to the plurality of ports and the forwarding memory, the search engine configured to schedule and perform accesses to the forwarding memory and to transfer the indication to the first port.

19. The network device of claim 18, wherein the search engine is configured to eliminate Layer 2 (L2) destination address (DA) matching whenever an L2 learning cycle is needed.

20. The network device of claim 19, wherein the first memory comprises one or more content addressable memories (CAMs), and wherein the second memory comprises a random access memory (RAM).

21. The network device of claim 18, wherein the first memory and the second memory may be accessed in parallel.

22. The network device of claim 21, wherein the search engine is configured to pipeline accesses to the first memory and the second memory.

23. The network device of claim 22, wherein the first memory comprises one or more content addressable memories (CAMs), and wherein the second memory comprises a random access memory (RAM).

* * * * *